No. 683,733. Patented Oct. 1, 1901.
J. J. DRAGE & E. T. BRIDGLAND.
REFRIGERATOR.
(Application filed June 9, 1899.)
(No Model.)
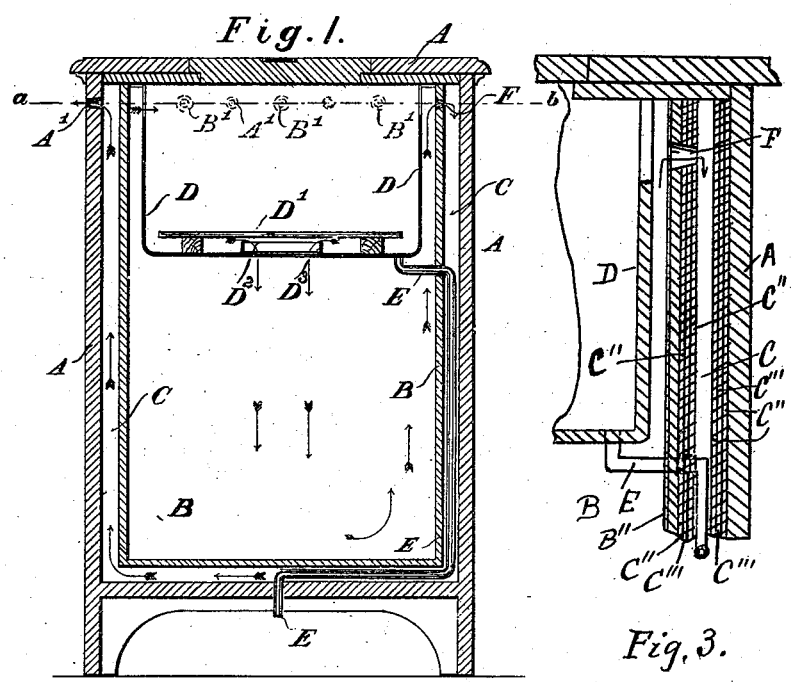
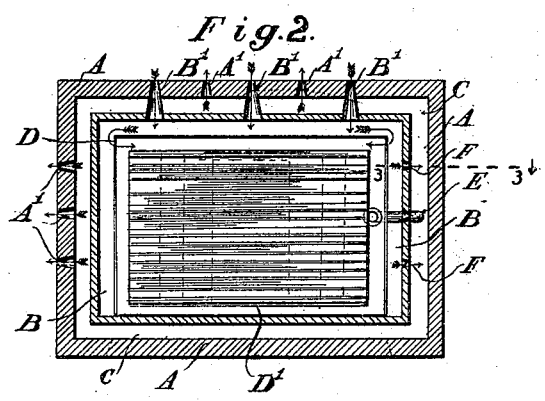
Witnesses:
C. Holloway
W. C. Pinckney
Inventors:
John James Drage
Edward Thomas Bridgland
By J. E. M. Bowen
Attorney

UNITED STATES PATENT OFFICE.

JOHN JAMES DRAGE, OF EAST ADELAIDE, AND EDWARD THOMAS BRIDGLAND, OF NORTH ADELAIDE, SOUTH AUSTRALIA.

REFRIGERATOR.

SPECIFICATION forming part of Letters Patent No. 683,733, dated October 1, 1901.

Application filed June 9, 1899. Serial No. 719,878. (No model.)

*To all whom it may concern:*

Be it known that we, JOHN JAMES DRAGE, manufacturer, residing at First avenue, East Adelaide, and EDWARD THOMAS BRIDGLAND, hardware salesman, residing at Hill street, North Adelaide, South Australia, subjects of the Queen of Great Britain, have invented certain new and useful Improvements in Refrigerators; and we do hereby declare the following to be a full, clear, and exact description of the invention, such as will enable others skilled in the art to which it appertains to make and use the same.

Our invention relates to improvements in refrigerators for the preservation and storage of articles of food, and refers more particularly to that class of refrigerators in which ice or other suitable means is employed to produce the requisite cold. Though for convenience described herein with respect to ice, that being a cold-producer more commonly in use, it must be understood that in the term "ice" is included any suitable means or substance for producing the requisite cold.

In the refrigerators at present in use the central storage-chamber is surrounded with a jacket or dead-air space, which is usually packed with some non-conducting material. Owing to the absence of communication between the inner chamber and the outer jacket there is no circulation of air within the inner chamber, and the air therein becomes after a time stale and laden with vapor. It is found that the tastes and flavors of the various articles stored in the refrigerator are transmitted from the one to the other and that the moisture in the air condensing upon the cool sides of the chamber has a further ill effect.

The object of our invention is to provide a dry-air refrigerator free from these defects by obtaining a continuous circulation of cool air within the storage-chamber. We accomplish this object by providing a refrigerator consisting of an inner storage-chamber having an ice-box and surrounded with a jacket or air-space. This inner chamber is provided with inlets and air-vents for the passage of the air-current. The inlets are preferably arranged adjacent to the ice-box, and the air entering thereby is thus immediately cooled by the ice and sinks to the bottom of the chamber. The air-vents for the outward passage of the air are preferably arranged leading into the jacket or air-space. The air then passes through vents into the outer jacket, which is further provided with outlets in such manner that the air is required to circulate completely around the refrigerator before finally escaping. The air upon its entry to the chamber is cooled by the ice and sinks to the bottom and is thus caused to circulate within the inner chamber, through the vents into the outer jacket, around this jacket, and finally out through the outlets upon the other side. By this means a continuous circulation of cold air is maintained through and around the chamber, the inside of which is kept perfectly dry and at a uniform low temperature and the contents continually fresh and sweet without transmitting their flavor the one to the other. We also provide a special lining for the storage-chamber incapable of absorbing any odors or flavors of the articles stored.

Though herein described as adapted to a chest or box for domestic use, our invention is applicable to cool storage rooms and chambers, to portable cars and carriages for railway and other transit, and any other refrigerator of the class mentioned.

Reference is had to the accompanying drawings, in which—

Figure 1 is a vertical section of our invention as applied to a refrigerating-chest. Fig. 2 is a transverse section of the same, taken on line $a\ b$, Fig. 1. Fig. 3 is a section on line 3 3 of Fig. 2.

A is the outer casing of our improved refrigerating chest or chamber and is constructed of wood or other suitable material. Within the outer casing A is provided an inner storage-chamber B, also constructed, preferably, of wood and lined throughout with enameled iron B''. The inner chamber B is so arranged within the outer casing A that there is a jacket or air-space C between the two casings, and this jacket extends around the sides and bottom of chamber B. The jacket or air-space C may be packed in the ordinary way; but the packing which we prefer to adopt consists of alternate layers C'' C''', of roberoid and asbestos, only partially filling space C, as shown in Fig. 3. This packing must, however, be so arranged as to give a free circulation of air within the jacket, as hereinafter described. The inner storage-chamber B is further provided with an ice-box D, preferably at the top, and constructed of metal or other suitable material, enameled or otherwise coated, and having an ice-tray D' and an air-vent $D^2$, with a flange $D^3$ to prevent the drip of water into the chamber B. A drip-pipe E is also provided for the drainage of the water formed by the melting of the ice. This drip-pipe E may be arranged to pass direct through the chamber B; but we prefer to conduct it through the jacket C and out at the bottom, where it delivers into a pan or other receptacle placed for the purpose.

In order to maintain a free circulation of air, we provide a series of inlets B', arranged, preferably, at the back and adjacent to the ice-box D. The air passing in through the inlets B' is immediately cooled and sinks to the bottom of the chamber B, and thus causes a circulation of air within the chamber B. For the purpose of maintaining this circulation we provide a series of vents F in the casing of the inner chamber B, leading into the jacket or air-space C, and these are arranged, preferably, at the top and upon the same side as that through which the drip-pipe E passes. The drip-pipe E thus assists the circulation of air by cooling it and causing it to fall and also maintaining it at a low temperature. Upon the other side is arranged a series of outlets A' in the outer casing A, thus affording means for a complete circulation of air. By means of the inlets B' the air passes direct into the inner chamber B and is immediately cooled by the ice within the ice-box D. The cold air being heavier than that of a higher temperature sinks, and thus causes a circulation within the chamber B, as shown by the arrows. The air then passes through the vents F into the jacket C, around which it circulates, and finally passes out through the outlets A'. The long narrow passage formed by the jacket C, the inlet and outlet vents being upon opposite sides, causes a draft and maintains the continuous circulation of air. By means of this continuous circulation of cold air the chamber B is kept continually dry and at a uniform low temperature.

The chamber B is lined throughout with enameled iron B''. This lining, being non-absorbent, prevents any of the contents of the storage-chamber being tainted or affected while in the refrigerator.

Having now particularly described and ascertained the nature of our said invention and in what manner the same is to be performed, we declare that what we claim is—

1. In a refrigerator, the combination of an outer casing, an inner storage-chamber, an air-space between the casing and the storage-chamber, an ice-box within the storage-chamber and in the upper part thereof, an air-space between the ice-box and the walls of the storage-chamber, inlets from the exterior air for the introduction of fresh air to the air-space around the ice-box, air-vents leading from the upper part of the storage-chamber into the air-space around the chamber, and air-vents leading from the air-space around the storage-chamber through the outer casing at its top to the outer air.

2. In a refrigerator, the combination of an outer casing, an inner storage-chamber, an ice-box in the upper part of said chamber, an air-space between the ice-box and the walls of the storage-chamber, inlets from the outside of the outer casing and communicating with the air-space between the ice-box and the walls of the storage-chamber for the introduction of exterior fresh air to said air-space, air-vents leading from the storage-chamber at its top into the air-space around the chamber and into the casing, an insulating-lining for said space, and air-vents leading from the air-space through the outer casing to the outer air.

3. In a refrigerator the combination of an outer casing, an inner storage-chamber, an ice-box in the top of the storage-chamber, an air-space between the ice-box and the walls of the storage-chamber communicating at its top with the air exterior to the refrigerator, and an air-space between the outer casing and the storage-chamber through which the air circulates before escaping into the outer air, the outlets being at the top of said space.

In testimony whereof we affix our signatures in presence of two witnesses.

JOHN JAMES DRAGE.
    EDWARD THOMAS BRIDGLAND.

Witnesses:
 EDWIN B. COLTON,
 CHARLES S. BURGESS.